United States Patent
Weisberg et al.

(10) Patent No.: US 9,807,301 B1
(45) Date of Patent: Oct. 31, 2017

(54) VARIABLE PRE- AND POST-SHOT CONTINUOUS FRAME BUFFERING WITH AUTOMATED IMAGE SELECTION AND ENHANCEMENT

(71) Applicant: Microsoft Technology Licensing, LLC, Redmond, WA (US)

(72) Inventors: Joshua Bryan Weisberg, Redmond, WA (US); Baoyuan Wang, Redmond, WA (US); Sing Bing Kang, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/219,588

(22) Filed: Jul. 26, 2016

(51) Int. Cl.
*H04N 5/232* (2006.01)
*G06K 9/62* (2006.01)
(Continued)

(52) U.S. Cl.
CPC ....... *H04N 5/23222* (2013.01); *G06K 9/6267* (2013.01); *G06T 7/20* (2013.01);
(Continued)

(58) Field of Classification Search
CPC ............ H04N 5/2353; H04N 5/23222; H04N 5/23293; H04N 5/2145; G06K 7/20; G06K 13/00; G06K 9/6267
See application file for complete search history.

(56) References Cited

U.S. PATENT DOCUMENTS 8,319,859 B2    11/2012  Kim et al.
8,625,001 B2     1/2014  Crisan et al.
(Continued)

FOREIGN PATENT DOCUMENTS

CN    203786779 U    8/2014
JP    2006140892 A   6/2006

OTHER PUBLICATIONS

"API to capture Live Photos in iOS9", Retrieved on: Jul. 12, 2016 Available at: http://stackoverflow.com/questions/32864449/api-to-capture-live-photos-in-ios9.

*Primary Examiner* — Tuan Ho
(74) *Attorney, Agent, or Firm* — Lyon & Harr, LLP; Mark A. Watson

(57) ABSTRACT

A "Moment Capture System" automatically captures and buffers multiple image frames, both prior to and following digital camera shutter activation. This capture and buffering is performed in combination with real-time automatic control of camera settings (e.g., exposure time, capture rate, ISO, white balance, aperture, etc.) based on an ongoing real-time evaluation of contents and characteristics of most recent previously buffered frames. Whenever a shutter activation (e.g., a "tap") is detected, the Moment Capture System pulls some number of pre-tap frames from the buffer and adds some number of post-tap frames to create an "image moment." Image moments are defined as sets of sequential frames spanning a time period before and after the detected tap. In various implementations, the Moment Capture System performs automated selection of perceptually best images from the buffered frames associated with each tap. This automated selection closely emulates human selection based on subjective subtleties of human preferences.

20 Claims, 5 Drawing Sheets

(51) Int. Cl.
 *G06T 13/00* (2011.01)
 *G06T 7/20* (2017.01)
 *H04N 1/21* (2006.01)
 *H04N 5/235* (2006.01)

(52) U.S. Cl.
 CPC ........... *G06T 13/00* (2013.01); *H04N 1/2145* (2013.01); *H04N 5/2353* (2013.01); *H04N 5/23293* (2013.01)

(56) References Cited

U.S. PATENT DOCUMENTS

| | | |
|---|---|---|
| 2003/0189647 A1 | 10/2003 | Kang |
| 2004/0070679 A1 | 4/2004 | Pope |
| 2007/0270182 A1* | 11/2007 | Gulliksson ......... H04N 1/00413 455/556.1 |
| 2011/0169987 A1 | 7/2011 | Gann |
| 2012/0044380 A1* | 2/2012 | Imai ..................... H04N 9/735 348/223.1 |
| 2012/0127334 A1* | 5/2012 | Imai ..................... H04N 9/045 348/223.1 |
| 2012/0201426 A1 | 8/2012 | Jasinski et al. |
| 2012/0300092 A1 | 11/2012 | Kim et al. |
| 2013/0176458 A1 | 7/2013 | Van Dalen et al. |
| 2013/0265453 A1 | 10/2013 | Middleton et al. |
| 2014/0111670 A1 | 4/2014 | Lord et al. |
| 2015/0029349 A1 | 1/2015 | Ben Israel et al. |

\* cited by examiner

VARIABLE PRE- AND POST-SHOT CONTINUOUS FRAME BUFFERING WITH AUTOMATED IMAGE SELECTION AND ENHANCEMENT

BACKGROUND

When capturing images with a digital camera, there is an inherent lag between the time a person observes a moment of interest and when their finger taps the shutter button. In the case of images having dynamic or moving content or images captured with a moving camera, this lag often results in an image that doesn't quite match the moment seen or recollected by the photographer. As such, professional photographers often attempt to anticipate the best moment and start capturing photos before that moment occurs in an attempt to capture that moment in an image. Some consumers mimic this behavior on their mobile phones or other digital cameras by repeatedly taking sequences of photos in an attempt to capture one good moment. Similarly, some cameras automatically capture multiple sequential images as a burst when the user presses the shutter button.

In each case, this capturing of multiple sequential image frames often results in many photos of uninteresting moments or poor image aesthetics. In addition, repeated tapping of the shutter by the user often causes the camera device to move, which in turn may result in blurry or shaky images. Further, the photographer, professional or otherwise, is typically left to perform the potentially time-consuming task of reviewing a large number of image frames to identify any images that are worth keeping. In addition, it's often difficult for users to discern subtle differences between these images, particularly on a small screen. Further, while the photographer is rapidly capturing image frames, they are typically no longer "present" in the moment, meaning they are not observing or participating in the scene but rather focusing on trying to push the shutter button repeatedly. This generally precludes the photographer from actually enjoying the moment and from making adjustments to what images are being captured or how those images are being captured during that moment.

SUMMARY

The following Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Further, while certain disadvantages of other technologies may be discussed herein, the claimed subject matter is not intended to be limited to implementations that may solve or address any or all of the disadvantages of those other technologies. The sole purpose of this Summary is to present some concepts of the claimed subject matter in a simplified form as a prelude to the more detailed description that is presented below.

In general, a "Moment Capture System" as described herein, provides various techniques for automatically capturing and buffering multiple image frames, both prior to and following activation of the shutter of a digital camera. Further, camera settings for capturing these frames are automatically controlled in real-time by the Moment Capture System based on an ongoing evaluation of various characteristics of one or more most recent buffered frames. Whenever a shutter activation (e.g., a "tap") is detected, the Moment Capture System pulls some number of pre-tap frames from the buffer and adds some number of post-tap frames to create an "image moment" that is then saved or otherwise stored for later use. An "image moment" is specifically defined herein as a set of sequential frames spanning a period of time (that depends on the frame capture rate) both prior to and following the detected shutter tap.

Whether or not a tap has been detected, the Moment Capture System continuously monitors and evaluates the incoming recently buffered frames to determine image characteristics and to perform scene classification. In various implementations, this scene classification detects or extracts frame characteristics including, but not limited to, human faces, subject motion, camera motion, etc. This classification data is then used to adjust how the next frame is captured by automatically adapting camera and buffer settings. Advantageously, this dynamic and real-time control of camera and buffer settings based on previously buffered image frames optimizes the capture sequence for any particular image moment by ensuring that frames being captured and stored in the buffer are appropriate for the identified characteristics of the scene.

For example, in various implementations, the Moment Capture System is instantiated within a digital camera that is configured to continuously capture image frames to a buffer while a viewfinder of the camera is active. Computing functionality of the digital camera is applied to automatically extract a plurality of scene characteristics from one or more most recently buffered image frames as an ongoing real-time function. In addition, computing functionality of the digital camera is applied to determine and apply real-time or near real-time automatic adjustments of image capture settings of the camera as an ongoing real-time function of most recently extracted scene characteristics. In various implementations, these image capture settings comprise at least a determination of a first number of most recently buffered image frames to be extracted from the buffer following a detection of a shutter activation of the camera and a determination of a second number of image frames to be captured by the camera following the detection of the shutter activation. Then, in response to detection of the camera shutter activation, the computing functionality of the camera is applied to construct and output an image moment comprising multiple image frames. The multiple image frames of the image moment comprise the first number of most recently buffered image frames extracted from the buffer and the second number of image frames captured by the camera following the shutter activation.

Further, in various implementations, following generation of an image moment in response to a detected shutter tap, the frames of that image moment are optionally further processed. For example, in various implementations, this further processing includes, but is not limited to, automated selection of one or more perceptually best images from the frames of the image moment in a way that closely emulates human selection based on subjective subtleties of human preferences. In addition, in various implementations, one or more of the frames of the image moment, or simply one or more of the selection of perceptually best images, are further processed to automatically enhance those frames via any combination of histogram stretching, automated exposure correction, detail enhancement, automated color saturation adjustments, noise removal, etc. Further, in various implementations, two or more frames of the image moment are stitched together to create an animated looping image sequence.

The Moment Capture System described herein provides various techniques for continuously buffering a fixed or variable number of image frames, both prior to and following activation of the camera shutter, in combination with an automated analysis of buffered frames to provide real-time control of camera exposure settings, frame rate, frame quantity and frame split for the image moment. In addition to the benefits described above, other advantages of the Moment Capture System will become apparent from the detailed description that follows hereinafter.

BRIEF DESCRIPTION OF THE DRAWINGS

The specific features, aspects, and advantages of the claimed subject matter will become better understood with regard to the following description, appended claims, and accompanying drawings where:

DETAILED DESCRIPTION

Figure 1:
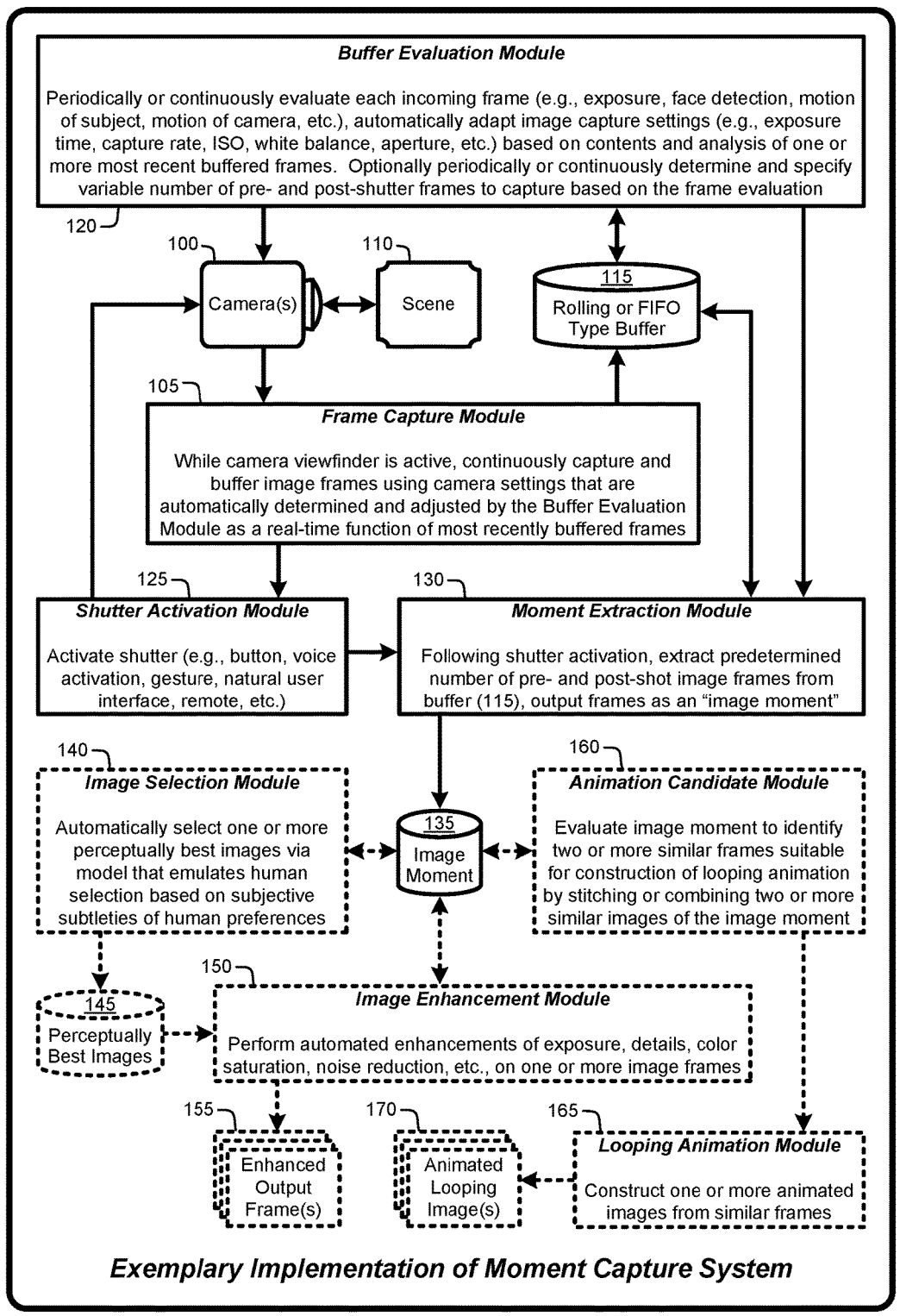
FIG. 1 provides an exemplary architectural flow diagram that illustrates program modules for effecting various implementations a "Moment Capture System," as described herein.

In the following description of various implementations of a "Moment Capture System," reference is made to the accompanying drawings, which form a part hereof, and in which is shown by way of illustration specific implementations in which the Moment Capture System may be practiced. Other implementations may be utilized and structural changes may be made without departing from the scope thereof.

Specific terminology will be resorted to in describing the various implementations described herein, and it is not intended for these implementations to be limited to the specific terms so chosen. Furthermore, it is to be understood that each specific term includes all its technical equivalents that operate in a broadly similar manner to achieve a similar purpose. Reference herein to "one implementation," or "another implementation," or an "exemplary implementation," or an "alternate implementation" or similar phrases, means that a particular feature, a particular structure, or particular characteristics described in connection with the implementation can be included in at least one implementation of the Moment Capture System. Further, the appearance of such phrases throughout the specification are not necessarily all referring to the same implementation, and separate or alternative implementations are not mutually exclusive of other implementations. The order described or illustrated herein for any process flows representing one or more implementations of the Moment Capture System does not inherently indicate any requirement for the processes to be implemented in the order described or illustrated, and any such order described or illustrated herein for any process flows do not imply any limitations of the Moment Capture System.

As utilized herein, the terms "component," "system," "client" and the like are intended to refer to a computer-related entity, either hardware, software (e.g., in execution), firmware, or a combination thereof. For example, a component can be a process running on a processor, an object, an executable, a program, a function, a library, a subroutine, a computer, or a combination of software and hardware. By way of illustration, both an application running on a server and the server can be a component. One or more components can reside within a process and a component can be localized on one computer and/or distributed between two or more computers, and may be distributed within various stage and computing functionality of cloud-based storage and computing services. The term "processor" is generally understood to refer to a hardware component, such as a processing unit of a computer system.

Furthermore, to the extent that the terms "includes," "including," "has," "contains," variants thereof, and other similar words are used in either this detailed description or the claims, these terms are intended to be inclusive in a manner similar to the term "comprising" as an open transition word without precluding any additional or other elements.

1.0 Introduction

In general, a "Moment Capture System" as described herein, is operable with various digital cameras, including, but not limited to, standalone digital cameras, cameras integral or coupled to tablet, notebook or desktop type computers, cameras integral to mobile phone type devices, digital video cameras, etc. The Moment Capture System provides various techniques for capturing and buffering multiple image frames to a rolling or FIFO type buffer, both prior to and following activation of a shutter of the digital camera. The continuous buffering of image frames begins either as soon as the camera viewfinder of the digital camera is engaged or upon initiation of the Moment Capture System within computing functionality integral or coupled to the digital camera. Further, one or more of the most recent frames in the buffer are evaluated in real time to determine image and scene characteristics. These image and scene characteristics are then applied to determine new real-time adjustments to camera settings (e.g., exposure time, capture rate, ISO, white balance, aperture, etc.) for capturing subsequent image frames, which are in turn evaluated for ongoing determinations of new real-time adjustments to the camera settings. Any desired techniques for adapting camera settings based on characteristics of prior images may be used for this purpose.

Then, whenever a shutter activation (e.g., a "tap") is detected, the Moment Capture System pulls some number of pre-tap frames from the buffer and adds some number of post-tap frames to create an "image moment" that is then saved or otherwise stored for later use. An "image moment" is specifically defined herein as a set of sequential frames spanning a period of time (that depends on the frame capture rate) both prior to and following the detected shutter tap. The total number of pre- and post-tap frames to be used for generation of the image moment is automatically determined by the Moment Capture System as an ongoing real-time function of the scene and image characteristics of one or more of the most recently buffered image frames.

Further, in various implementations, the Moment Capture System performs an automated selection of one or more perceptually best images from the image moment. This real-time selection of the perceptually best images is achieved by applying a probabilistic or machine-learned model to the image moment. This probabilistic or machine-learned model is trained to select one or more perceptually best images from the image moment in a way that closely emulates human selection based on subjective subtleties of human preferences.

For example, when taking a photo of a person, the camera shutter is often pressed at the moment the subject blinks their eyes, resulting in a photo of the subject with their eyes closed or only partially open. However, because the Moment Capture System captures and buffers multiple image frames, both pre- and post-shutter activation, the probability of capturing an image of the subject with their eyes open is significantly increased. Advantageously, the automated selection of one or more perceptually best images from the image moment via the probabilistic or machine-learned model considers such factors to rank frames of the image moment based on characteristics such as whether the eyes of one or more persons in the image are open or closed, whether those persons are looking towards the camera, etc., so as to emulate human selection based on modeled human preferences.

Additional optional real-time processing that may be performed on the frames of the image moment includes, but is not limited to, automatic real-time enhancement of one or more of the selected perceptually best images or other frames from the image moment, creating looping animated images from one or more frames of the image moment, etc. Image processing techniques applied for image enhancement include, but are not limited to, automated exposure corrections such as histogram stretching, adjustments to shadows, highlights, high-frequency features, automated adjustments to image color saturation, multi-image denoising, etc.

In various implementations, real-time image enhancements are provided via computing functionality of the digital camera. However, in various implementations, such image enhancements, and optionally selection of perceptually best images or creation of looping animations, is provided via functionality of cloud-based storage and computing services following transmission of image moments from the digital camera to one or more cloud-based storage and computing services.

Advantageously, these real-time capture and enhancement capabilities and features significantly reduce user workload when attempting to capture high-quality images of a scene or to enhance such images via exposure or color saturation corrections, or through creation of animations, especially in the case of dynamic scenes and scenes with one or more faces.

1.1 System Overview:

As mentioned above, the Moment Capture System provides various techniques for continuously buffering a fixed or variable number of image frames, both prior to and following activation of the camera shutter, in combination with an automated analysis of buffered frames to provide real-time control of camera exposure settings, frame rate, frame quantity and frame split for the image moment. The processes summarized above are illustrated by the general system diagram of FIG. 1. In particular, the system diagram of FIG. 1 illustrates the interrelationships between program modules for implementing various implementations of the Moment Capture System, as described herein. Furthermore, while the system diagram of FIG. 1 illustrates a high-level view of various implementations of the Moment Capture System, FIG. 1 is not intended to provide an exhaustive or complete illustration of every possible implementation of the Moment Capture System as described throughout this document.

In addition, any boxes and interconnections between boxes that may be represented by broken or dashed lines in FIG. 1 represent alternate implementations of the Moment Capture System described herein, and any or all of these alternate implementations, as described below, may be used in combination with other alternate implementations that are described throughout this document.

For example, as illustrated by FIG. 1, in various implementations, the processes enabled by the Moment Capture System begin operation whenever a camera viewfinder of a digital camera 100 is active or whenever a user instructs the Moment Capture System to begin operation. When operational, the Moment Capture System applies a Frame Capture Module 105 to continuously capture and store image frames of a scene 110 to a rolling or FIFO type buffer 115. The Frame Capture Module 105 causes the camera 100 to capture frames using automatically and dynamically adapted camera settings based on one or more most recent buffered image frames. These camera settings are determined and controlled as an ongoing real-time function by a Buffer Evaluation Module 120 as a function of one or more most recent image frames in the buffer 115.

More specifically, in various implementations, the Buffer Evaluation Module 120 periodically or continuously evaluates one or more most recent frames in the buffer 115 to determine scene and image characteristics including, but not limited to, exposure, face detection, motion of subject, motion of camera, etc. The Buffer Evaluation Module 120 then applies these characteristics to automatically adapt image capture settings of the camera 100. The image capture settings controlled by the Buffer Evaluation Module 120 include, but are not limited to, exposure time, capture rate (e.g., frames per second), ISO, white balance, aperture, etc. In other words, the Buffer Evaluation Module 120 examines one or more new or most recent frames in the buffer 115 to adapt camera 100 settings to improve capture of subsequent frames captured and added to the buffer. Any desired techniques for adapting camera settings based on characteristics of prior images may be used for this purpose.

For example, when capturing a scene with a dynamically moving subject, such as a child playing soccer or other relatively fast or dynamic scene actions or motions, camera settings such as, for example, higher frame rates and higher numbers of frames tend to increase the likelihood of capturing one or more acceptable image frames. However, for many other scenes, such as relatively static scenes, camera settings for fewer frames captured at a slower frame rate are typically adequate. Advantageously, such adaptations tend to reduce power consumption on the camera by automatically reducing frame capture rates as a real-time function of scene dynamics.

Further, in various implementations, based on the evaluation of incoming frames in the buffer, the Buffer Evaluation Module 120 optionally periodically or continuously determines and specifies a variable number of pre- and post-shutter frames to be captured or included in the image moment. In other words, in various implementations, the Buffer Evaluation Module 120 determines how many frames from the buffer 115 prior to shutter activation are to be included in the image moment and how many frames are to be captured and included in the image moment following shutter activation. In various implementations, the split between pre- and post-shutter number of frames is equal, e.g., 5 frames prior to shutter tap and 5 frames after shutter tap. However, depending on the scene and image characteristics determined by the Buffer Evaluation Module 120, the numbers of pre- and post-shutter frames may be different, e.g., 7 pre-shutter frames and 3 post-shutter frames.

In various implementations, the Moment Capture System applies a Shutter Activation Module 125 to determine or otherwise detect when the shutter of camera has been activated. Shutter activation can occur in a variety of ways, including, but not limited to, touch or tap of physical, display-based or virtual shutter buttons, voice activation, gesture-based activations or other natural user interface (NUI) based interactions, remote activation, motion- or scene content-based activations, etc. Regardless of how the shutter is activated, the Shutter Activation Module then passes an indication of such activation to a Moment Extraction Module 130. In general, following shutter activation, the Moment Extraction Module 130 extracts the predetermined number of pre- and post-shot image frames from the buffer 115, and then outputs that sequence of frames as an "image moment" 135.

In various implementations, the resulting image moment 135 is then subjected to further processing. For example, in various implementations, the Moment Capture System applies an Image Selection Module 140 to automatically select one or more perceptually best images 145 from the image moment 135 via a machine-learned or statistical model that is trained on a combination of characteristics extracted from arbitrary images and human selections so as to emulate subjective human selection preferences.

Further, in various implementations, an Image Enhancement Module 150 of the Moment Capture System performs automated real-time image enhancement adjustments on one or more of the automatically selected perceptually best images 145 or one or more of the frames of the image moment 135 to produce one or more enhanced output frames 155. In various implementations, the Image Enhancement Module 150 applies any combination of exposure correction adjustments (e.g., white balance, tone, brightness, contrast, etc.), color saturation adjustments, image denoising operations, etc., using any desired image processing techniques.

In further implementations, an Animation Candidate Module 160 evaluates the frames of the image moment 135 to identify two or more similar frames suitable for construction of an animated looping image. If any such frames are identified by the Animation Candidate Module 160, those frames are passed to a Looping Animation Module 165 that automatically adapts and stitches those frames to construct one or more animated looping images 170.

2.0 Operational Details of the
Moment Capture System

The above-described program modules and/or devices are employed for instantiating various implementations of the Moment Capture System. The following sections provide a detailed discussion of the operation of various implementations of the Moment Capture System, and of exemplary methods and techniques for implementing the features and program modules described in Section 1 with respect to FIG. 1. In particular, the following sections provides examples and operational details of various implementations of the Moment Capture System, including:

An operational overview of the Moment Capture System;
Fixed or variable length FIFO-type buffering of image frames;
Real-time adjustments to camera settings based on recently buffered frames;
Generation of image moments in response to shutter taps;
Automated selection of perceptually best image frames;
Automated enhancement of images frames; and
Generation of animated looping images.

2.1 Operational Overview:

As mentioned above, the Moment Capture System provides various techniques for continuously buffering a fixed or variable number of image frames, both prior to and following activation of the camera shutter, in combination with an automated analysis of buffered frames to provide real-time control of camera exposure settings, frame rate, frame quantity and frame split for the image moment. In various implementations, the Moment Capture System then performs various additional operations on the image moment, such as, for example, automatically selecting one or more perceptually best image frames, automatically enhancing exposure, details and/or color saturation of one or more frames, multi-frame denoising, automatically constructing one or more animated looping images by stitching one or more frames of the image moment, etc.

2.2 Fixed or Variable Length FIFO-Type Buffering of Image Frames:

As mentioned above, the continuous buffering of image frames begins either as soon as the camera viewfinder of the digital camera is engaged or upon initiation of the Moment Capture System within computing functionality integral or coupled to the digital camera. Total buffer size can be fixed to some number equal to or greater than some maximum expected number of sequential frames comprising any particular image moment.

In various implementations, the buffer is instantiated in system memory or other data storage device. Further, in various implementations, following creation of the image moment and optional extraction of one or more perceptually best images from the image moment or other image enhancement operations, some or all of the remaining or extraneous image frames are optionally automatically deleted, thereby saving or maintaining storage space or memory.

2.3 Adjusting Camera Settings Based on Recently Buffered Frames:

As mentioned above, the continuous buffering of image frames begins either as soon as the camera viewfinder of the digital camera is engaged or upon initiation of the Moment Capture System within computing functionality integral or coupled to the digital camera. One or more of the most recent frames in the buffer are then evaluated on an ongoing basis to continuously determine image and scene characteristics for newly buffered frames. These image and scene characteristics are then applied to determine new real-time adjustments to camera settings (e.g., exposure time, capture rate, ISO, white balance, aperture, etc.) for capturing subsequent image frames, which are in turn evaluated for ongoing determinations of new real-time adjustments to the camera settings. In other words, camera settings are adapted in real-time as a function of buffered frames to ensure that subsequent frames will be captured with camera settings that are optimized to the characteristics of whatever dynamic scene is being captured. Any existing techniques for determining capture settings for the camera may be applied for this purpose. Any desired real-time or near real-time processing techniques can be used for such purposes, and the Moment Capture System is not intended to be limited to the exemplary camera setting adjustment techniques described herein.

For example, in various implementations, the camera settings are based on whether a face has been detected in the buffered frame being evaluated. In such cases, characteristics of the face are applied to set the capture settings for one or more subsequent frames. For example, when a salient face or faces is detected, the contents of face rectangles (as they span all the frames if a face is present) are given priority or greater weight in the calculations of exposure, frame rate, etc., compared to the background elements. This ensures that faces (represented by the contents of the face rectangles), are properly exposed, white balanced, etc.

In various implementations, the use of face rectangles and the like for delimiting regions of the image frames containing faces, are applied for various subsequent uses, including, but not limited to, selecting one or more perceptually best frames, enhancing those frames, and in generation of looping animations where one or more detected faces are stabilized relative to other parts of that animation.

2.4 Generation of Image Moments in Response to Shutter Taps:

Whenever a shutter activation or tap is detected, the Moment Capture System pulls some number of pre-tap frames from the buffer and adds some number of post-tap frames to create the image moment from a contiguous sequence of frames. As mentioned above, the image moment spans a period of time, both prior to and following the detected shutter tap, that is based on a combination of the automatically determined number of frames and the frame capture rate.

generation of the image moment, in various implementations, the Moment Capture System continues to buffer frames and perform real-time adaptations of camera and buffer settings in anticipation of another camera tap for collection of another image moment. As such, depending upon how fast a user taps the shutter the image capture rate, and the number of pre- and post-tap frames being added to the image moment, some post-tap frames of a first image moment may be pre-tap frames of a second image moment.

2.5 Automated Selection of Perceptually Best Image Frames:

In general, in various embodiments, the Moment Capture System applies a variety of image evaluation techniques to predict or otherwise identify one or more perceptually best image frames (e.g., whether a frame is predicted to be a subjectively good frame from a human perspective) from within the image moment. Any desired processing techniques can be used for such purposes, and the Moment Capture System is not intended to be limited to the exemplary techniques for selecting perceptually best image frames described herein.

For example, in various implementations, the Moment Capture System applies one or more predictive models (e.g., an image selection model) to rank all of the frames in the image moment from best to worst, using both high level features (such as image quality and sharpness) and low level features (such as eyes open or closed). In other words, in various implementations, the image selection model automatically ranks each of the images in the image moment set in terms of a predicted subjective goodness level. The top ranked image may then be identified as the predicted perceptually best image. In various implementations, the Moment Capture System then evaluates the remaining frames of the image moment to find one or more predicted high quality photos that are unique and distinct from the predicted perceptually best image frame. If found, these additional frames may be presented to the user as additional predicted best images.

More specifically, in various implementations, the Moment Capture System analyses each frame from the image moment and predicts a perceptually best image based in image traits such as, for example, quality and sharpness of the image and people traits such as whether detected faces have open eyes and/or smiles. Other model-based may also be applied by the Moment Capture System for use in performing automated selections of one or more perceptually best image frames.

For example, in various implementations, the Moment Capture System applies a machine-learned or statistical model that is trained to automatically select one or more perceptually best frames from the sequence of frames in the image moment in a way that closely emulates human selection based on subjective subtleties of human preferences. In general, this model is trained on a large set of predefined or user-defined features that are automatically extracted from multiple sets of sequences of images of some arbitrary scene in combination with selections of single best images from each set via crowd-sourced or expert-based evaluations of those sets. The best images selected from each such set via crowd-sourced or expert-based evaluations are annotated (e.g., annotation vectors) by the person or persons making the selection to include information relating to the features considered in selecting that best image. The resulting combination of features extracted from the image frames, human selections, and human annotated features, are then provided as training data to train or otherwise adapt the model to make automated selections of perceptually best images from arbitrary sequences of images of arbitrary scenes.

More specifically, in various implementations, multiple human users provide subjective choices or selections of a single best image from each of a large number of individual sets of images, with each set comprising multiple versions of an image of a scene. These human users may also rank images in each such set in terms of subjective quality. In addition, multiple features are automatically extracted from each of the images of each of those individual sets. Examples of such features include, but are not limited to, low level features such as blur, noise, luminance, color, contrast, etc., mid-level features such as salient objects, "rule of thirds" analysis, depth of field, etc., semantic features such as facial expressions, interesting motions, personal taste, etc.

The human selections are then provided in combination with the corresponding sets and the automatically extracted features to automatically train the machine-learned or statistical model. Advantageously, this training produces a machine-learned model that operates in real-time to predict a best image from arbitrary sequences of images captured from some arbitrary scene in a way that closely emulates human subjective choices and selections of best images.

Further, in various implementations, after predicting the best image, the model ranks the remaining frames of the image moment in terms of a predicted quality. The Moment Capture System then produces a remainder set of images by excluding one or more frames from the image moment having a predicted quality below a predefined or variable quality threshold level. Next, the Moment Capture System computes difference levels between the predicted best image and each of the images in the remainder set. Finally, the Moment Capture System optionally outputs one or more of the highest ranked images in the remainder set having a difference level exceeding a difference threshold level. In other words, in such embodiments, the Moment Capture System outputs one or more images that are both highly ranked and sufficiently different (e.g., sufficiently "unique" or "distinct") relative to the predicted best image that those highly ranked and sufficiently different images are likely to be of interest to the user.

2.6 Automated Enhancement of Images Frames:

As mentioned above, in various implementations, the Moment Capture System applies various image processing techniques to perform real-time image enhancements to one or more of the frames of the image moment or to one or more of the automatically selected perceptually best images. Any desired real-time or near real-time processing techniques can be used for such purposes, and the Moment Capture System is not intended to be limited to the exemplary exposure correction or image enhancement techniques described herein.

In various implementations, following whatever image enhancements or corrections are applied to any image frames, the Moment Capture System optionally provides a user interface that enables the user to compare before and after versions of that frame. Optionally, in various implementations, the user can then either accept or reject those changes, or optionally make or direct further changes or enhancements to that frame. In addition, in various implementations, the Moment Capture System optionally provides a user interface that enables the user to browse or interact with any or all of the frames of the image moment. However, in various implementations, frames not selected as the one or more perceptually best image frames or used to create a looping animation are automatically deleted so as to some or all of the remaining or extraneous image frames are optionally automatically deleted, thereby saving or maintaining storage space or memory.

In various implementations, image enhancement is performed as a function of scene characterization. For example, if one or more faces are detected in an image frame, the frame being enhanced or processed will be modified in a way that ensures that the appearance of people or faces in the frame are perceptually improved. However, in the more general case, image enhancements are performed based on a variety of models and image processing techniques.

For example, when enhancing any of the frames from the image moment, in various implementations the Moment Capture System first stretches an image histogram extracted from the frame by applying either a linear stretching function or a noise-aware non-linear stretching function to the image histogram. In general, this non-linear stretching function is generated by a scaling function or the like based on noise estimates for the digital camera to modify a linear stretching function and then clamping the resulting modified stretching function to a minimum and maximum intensity range corresponding to an image bit depth, e.g., [0, 255].

In addition, in various implementations, following the histogram stretching process, the Moment Capture System estimates parameters of a noise-aware S-curve that is then applied for tone mapping of shadows and/or highlights of the frame being processed. Further, in various implementations, the Moment Capture System extracts a plurality of high-frequency image details from the frame being processed using various detail extraction functions. These extracted details are then modified or adjusted based on noise estimates for the digital camera. The modified image details are then fused with results of the tone mapping process.

Further, in various implementations, the Moment Capture System adapts or adjusts color saturation of the frame being processed by a color saturation model that is jointly trained on noise estimates for the digital camera and human selections of preferred color saturation adjustments to arbitrary images of arbitrary scenes.

In addition, in various implementations, any or all of the histogram stretching adjustments, S-curve-based tone mapping, detail fusion, and color saturation adjustments may be applied to the frame being processed, either individually or in any desired combination or order of the outputs of any of these image enhancements or adjustments achieve a variety of automated image enhancement. Further, any or all of the histogram stretching adjustments, S-curve-based tone mapping, detail fusion, and color saturation adjustments may be combined with any other existing image processing techniques to improve perceptual quality of resulting output images.

2.7 Generation of Animated Looping Images:

As mentioned above, in various implementations, the Moment Capture System evaluates the buffered frames associated with each shutter activation (i.e., the corresponding frames of the image moment) to determine if two or more of those frames contain content that is sufficiently similar while exhibiting enough relative motion that those images would be suitable for construction of a looping animation. If so, the Moment Capture System performs various alignment and stitching operations to construct a looping animation from those frames.

There is no requirement for the order of the frames in the animation to coincide with the order in which those frames were captured. However, depending on the particular image frames, the looping animated images tend to look more natural when stitching or otherwise combining sequential frames. Further, various elements of the frames, e.g., faces or other objects, may be isolated and stabilized in the animation. For example, a face detected in the image frames may be isolated (e.g., extracted from one or more of the frames) and stabilized in a fixed position in the resulting animation. In this animation, the stabilized face (or other object) maintains a fixed position, while dynamic elements from the other image frames appear to be animated by quickly cycling those frames. Any of a variety of image stitching and looping techniques may be applied by the Moment Capture System for construction of looping animated images.

3.0 Operational Summary of the Moment Capture System

Figure 2:
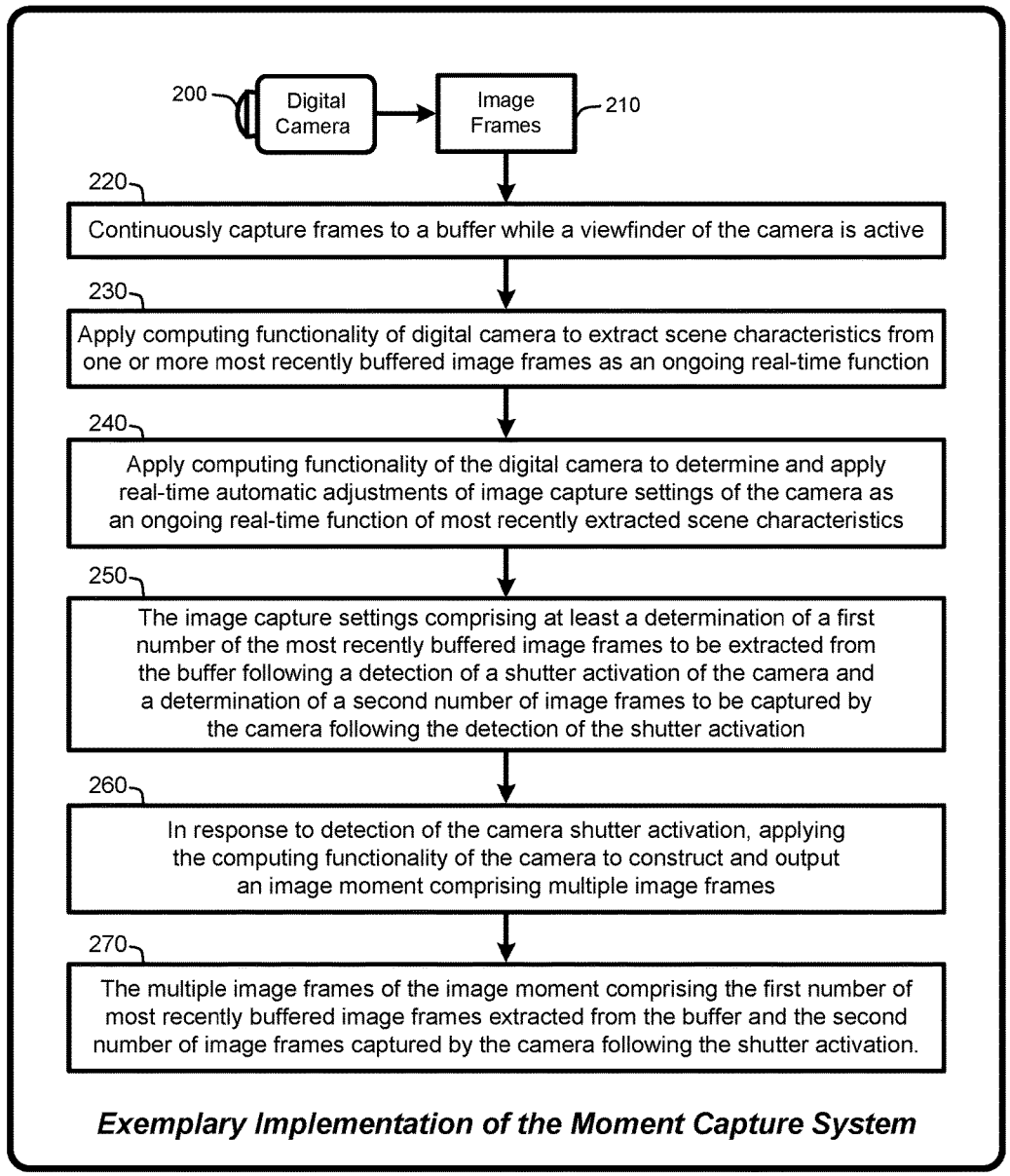
FIG. 2 illustrates a general system flow diagram that illustrates exemplary techniques for effecting various implementations of the Moment Capture System, as described herein.
Figure 3:
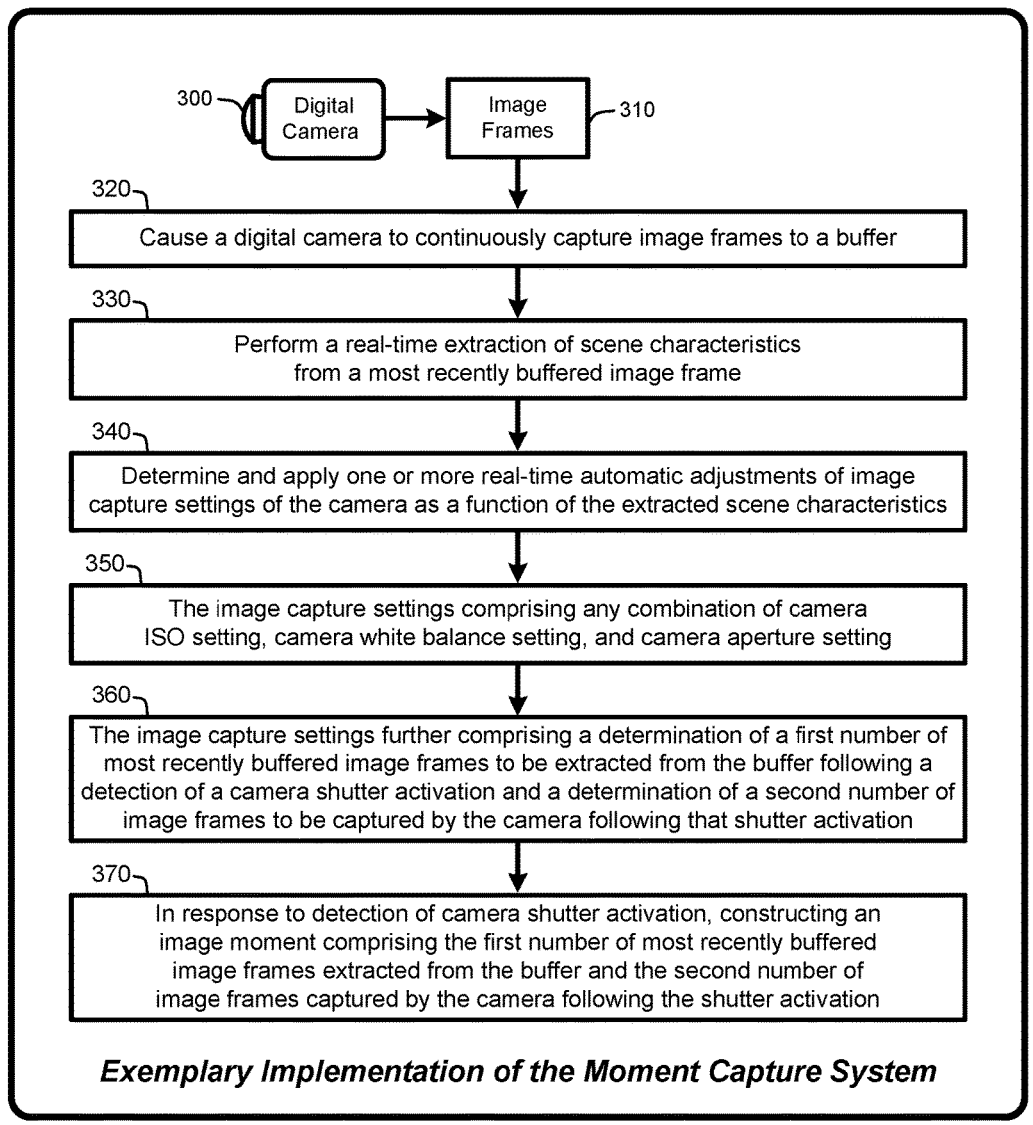
FIG. 3 illustrates a general system flow diagram that illustrates exemplary techniques for effecting various implementations of the Moment Capture System, as described herein.
Figure 4:
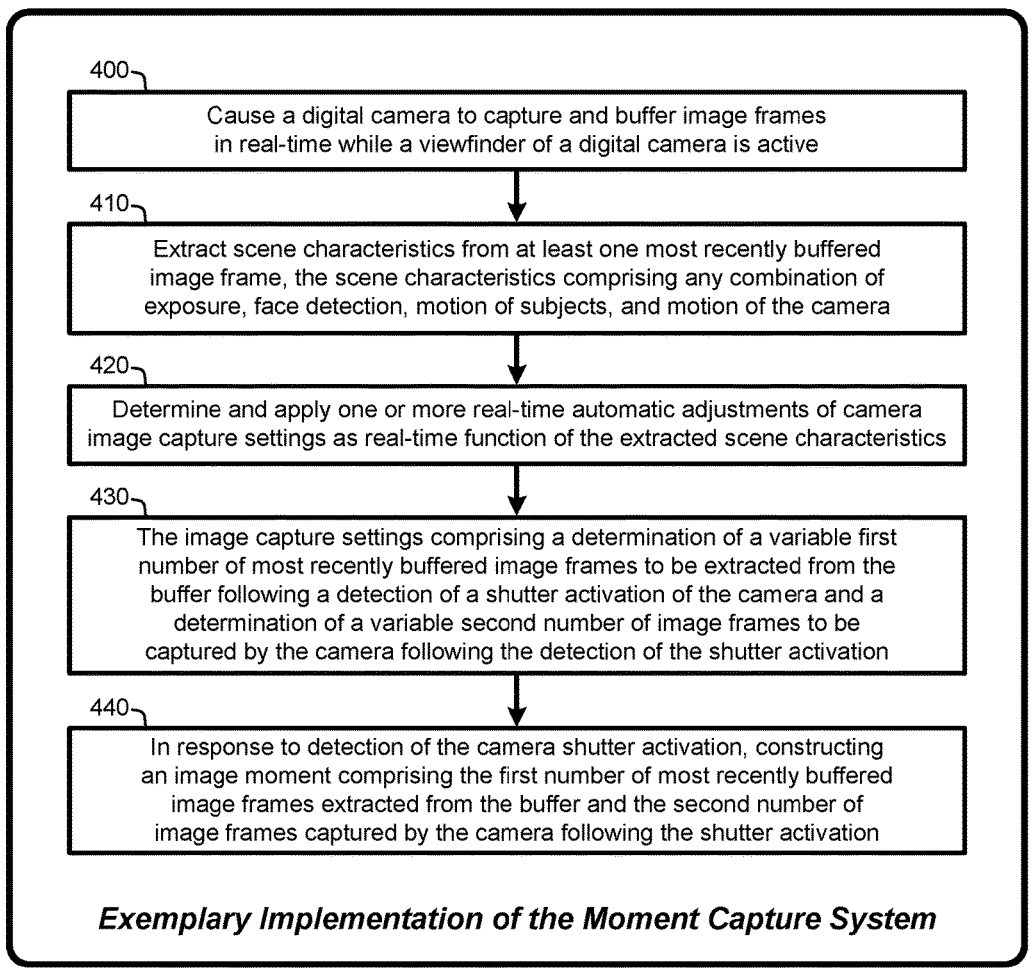
FIG. 4 illustrates a general system flow diagram that illustrates exemplary techniques for effecting various implementations of the Moment Capture System, as described herein.

The processes described above with respect to FIG. 1, and in further view of the detailed description provided above in Sections 1 and 2, are illustrated by the general operational flow diagrams of FIG. 2 through FIG. 4. In particular, FIG. 2 through FIG. 4 provide exemplary operational flow diagrams that summarizes the operation of some of the various implementations of the Moment Capture System. FIG. 2 through FIG. 4 are not intended to provide an exhaustive representation of all of the various implementations of the Moment Capture System described herein, and the implementations represented in these figures are provided only for purposes of explanation.

Further, any boxes and interconnections between boxes that may be represented by broken or dashed lines in FIG.

2 through FIG. 4 represent optional or alternate implementations of the Moment Capture System described herein, and any or all of these optional or alternate implementations, as described below, may be used in combination with other alternate implementations that are described throughout this document.

In general, as illustrated by FIG. 2, in various implementations, the Moment Capture System is instantiated within a digital camera 200 that is configured to continuously capture 220 image frames 210 to a buffer while a viewfinder of the camera is active. Computing functionality of the digital camera is applied to automatically extract 230 a plurality of scene characteristics from one or more most recently buffered image frames as an ongoing real-time function. In addition, computing functionality of the digital camera is applied to determine 240 and apply real-time automatic adjustments of image capture settings of the camera as an ongoing real-time function of most recently extracted scene characteristics. In various implementations, these image capture settings 250 comprise at least a determination of a first number of most recently buffered image frames to be extracted from the buffer following a detection of a shutter activation of the camera and a determination of a second number of image frames to be captured by the camera following the detection of the shutter activation. Then, in response to detection of the camera shutter activation, the computing functionality of the camera is applied 260 to construct and output an image moment comprising multiple image frames. The multiple image frames of the image moment comprise 270 the first number of most recently buffered image frames extracted from the buffer and the second number of image frames captured by the camera following the shutter activation.

Similarly, as illustrated by FIG. 3, in various implementations, the Moment Capture System begins operation by causing a digital camera 300 to continuously capture 320 image frames 310 to a buffer. The Moment Capture System then continues by performing 330 a real-time extraction of scene characteristics from a most recently buffered image frame. Next, the Moment Capture System determines and applies 340 one or more real-time automatic adjustments of image capture settings of the camera as a function of the extracted scene characteristics. In various implementations, these image capture settings comprising 350 any combination of camera ISO setting, camera white balance setting, and camera aperture setting. In addition, in various implementations, these image capture settings further comprise 360 a determination of a first number of most recently buffered image frames to be extracted from the buffer following a detection of a shutter activation of the camera and a determination of a second number of image frames to be captured by the camera following the detection of the shutter activation. Finally, in various implementations, in response to detection of the camera shutter activation, the Moment Capture System constructs 370 an image moment comprising the first number of most recently buffered image frames extracted from the buffer and the second number of image frames captured by the camera following the shutter activation.

Similarly, as illustrated by FIG. 4, in various implementations, the Moment Capture System begins operation by causing 400 a digital camera to capture and buffer image frames in real-time while a viewfinder of a digital camera is active. Next, in various implementations, the Moment Capture System extracts 410 scene characteristics from at least one most recently buffered image frame, the scene characteristics comprising any combination of exposure, face detection, motion of subjects, and motion of the camera. In various implementations, the Moment Capture System then determines and applies 420 one or more real-time automatic adjustments of image capture settings of the camera as a real-time function of the extracted scene characteristics. In various implementations, these image capture settings comprise 430 a determination of a variable first number of most recently buffered image frames to be extracted from the buffer following a detection of a shutter activation of the camera and a determination of a variable second number of image frames to be captured by the camera following the detection of the shutter activation. Finally, in various implementations, in response to detection of the camera shutter activation, the Moment Capture System constructs 440 an image moment comprising the first number of most recently buffered image frames extracted from the buffer and the second number of image frames captured by the camera following the shutter activation.

4.0 Exemplary Implementations of the Moment Capture System

The following paragraphs summarize various examples of implementations that may be claimed in the present document. The implementations summarized below are not intended to limit the subject matter that may be claimed in view of the detailed description of the Moment Capture System. Further, any or all of the implementations summarized below may be claimed in any desired combination with some or all of the implementations described throughout the detailed description and any implementations illustrated in one or more of the figures, and any other implementations and examples described below. The following implementations and examples are intended to be understood in view of the detailed description and figures described throughout this document.

In various implementations, a Moment Capture System is implemented by means, processes or techniques for continuously buffering a fixed or variable number of image frames, both prior to and following activation of the camera shutter, in combination with an automated analysis of buffered frames to provide real-time control of camera exposure settings, frame rate, frame quantity and frame split for the image moment generated in response to any detected shutter activation. As such, the Moment Capture System enhances and improves user experience by enabling users to capture images either before or after shutter taps, with automated control over both the camera settings and the number of images captured in response to a shutter tap, and automated selection of perceptually best image frames for presentation to the user.

As a first example, in various implementations, a system is implemented within a digital camera via means, processes or techniques for continuously capturing image frames to a buffer while a viewfinder of the camera is active. In various implementations, this exemplary system applies computing functionality of the digital camera to extract a plurality of scene characteristics from one or more most recently buffered image frames as an ongoing real-time function. In various implementations, this exemplary system continues by applying computing functionality of the digital camera to determine and apply real-time automatic adjustments of image capture settings of the camera as an ongoing real-time function of most recently extracted scene characteristics. In general, these image capture settings comprise at least a determination of a first number of most recently buffered image frames to be extracted from the buffer following a detection of a shutter activation of the camera and a determination of a second number of image frames to be captured by the camera following the detection of the shutter activation. Then, in various implementations, in response to detection of the camera shutter activation, this exemplary system continues by applying the computing functionality of the camera to construct and output an image moment comprising multiple image frames. In various implementations, the multiple image frames of the image moment comprise the first number of most recently buffered image frames extracted from the buffer and the second number of image frames captured by the camera following the shutter activation.

As a second example, in various implementations, the first example is further modified via means, processes or techniques wherein the image capture settings further comprise an image frame capture rate.

As a third example, in various implementations, any of the first example and the second example are further modified via means, processes or techniques wherein the image capture settings further comprise an image frame exposure setting.

As a fourth example, in various implementations, any of the first example, the second example and the third example are further modified via means, processes or techniques wherein the image capture settings further comprise any combination of camera ISO setting, camera white balance setting, and camera aperture setting.

As a fifth example, in various implementations, any of the first example, the second example, the third example and the fourth example, are further modified via means, processes or techniques wherein the scene characteristics further comprise any combination of exposure, face detection, motion of subjects, and motion of the camera.

As a sixth example, in various implementations, any of the first example, the second example, the third example, the fourth example and the fifth example are further modified via means, processes or techniques further comprising applying an image selection model to automatically rank each of the image frames in the image moment in terms of a predicted subjective goodness level.

As a seventh example, in various implementations, the sixth example is further modified via means, processes or techniques further comprising automatically outputting a highest ranked one of the image frames.

As an eighth example, in various implementations, any of the first example, the second example, the third example, the fourth example, the fifth, the sixth example and the seventh example are further modified via means, processes or techniques further comprising automatically enhancing one or more frames of the image moment via one or more image enhancement techniques to improve a subjective appearance of those one or more frames.

As a ninth example, in various implementations, any of the first example, the second example, the third example, the fourth example, the fifth, the sixth example, the seventh example, and the eighth example are further modified via means, processes or techniques further comprising automatically enhancing one or more frames of the image moment via one or more image enhancement techniques automatically evaluating the frames of the image moment to determine if two or more of those frames contain content that is sufficiently similar while exhibiting enough relative motion that those images would be suitable for construction of a looping animation, and constructing a looping animation from the suitable frames of the image moment.

As a tenth example, in various implementations, a system is implemented via means, processes or techniques that begin operations for applying a general-purpose computing device to perform process actions for causing a digital camera to continuously capture image frames to a buffer. In various implementations, this process continues by performing a real-time extraction of scene characteristics from a most recently buffered image frame. Next, in various implementations, this process continues by determining and applying one or more real-time automatic adjustments of image capture settings of the camera as a function of the extracted scene characteristics. These image capture settings may comprise any combination of camera ISO setting, exposure time, camera white balance setting, and camera aperture setting. Further, in various implementations, these image capture settings may comprise a determination of a first number of most recently buffered image frames to be extracted from the buffer following a detection of a shutter activation of the camera and a determination of a second number of image frames to be captured by the camera following the detection of the shutter activation. Finally, in various implementations, in response to detection of the camera shutter activation, this process continues by constructing an image moment comprising the first number of most recently buffered image frames extracted from the buffer and the second number of image frames captured by the camera following the shutter activation.

As an eleventh example, in various implementations, the first example is further modified via means, processes or techniques wherein the image capture settings further comprise an image frame capture rate.

As a twelfth example, in various implementations, any of the tenth example and the eleventh example are further modified via means, processes or techniques wherein the scene characteristics further comprise any combination of exposure, face detection, motion of subjects, and motion of the camera.

As a thirteenth example, in various implementations, any of the tenth example, the eleventh example and the twelfth example are further modified via means, processes or techniques further comprising applying an image selection model to automatically rank each of the image frames in the image moment in terms of a predicted subjective goodness level, and outputting one or more of the highest ranked image frames.

As a fourteenth example, in various implementations, the thirteenth example is further modified via means, processes or techniques further comprising automatically enhancing the one or more of the highest ranked image frames prior to outputting those frames.

As a fifteenth example, in various implementations, the first example is further modified via means, processes or techniques wherein the automatic enhancement further comprises any applying any combination of one or more image enhancement techniques to improve a subjective appearance of the one or more highest ranked image frames.

As a sixteenth example, in various implementations, any of the tenth example, the eleventh example, the twelfth example, the thirteenth example, the fourteenth example, and the fifteenth example are further modified via means, processes or techniques further comprising automatically evaluating the frames of the image moment to determine if two or more of those frames contain content that is sufficiently similar while exhibiting enough relative motion that those images would be suitable for construction of a looping animation, and constructing a looping animation from the suitable frames of the image moment.

As a tenth example, in various implementations, a real-time method is implemented via means, processes or techniques that begin operations by causing a digital camera to capture and buffer image frames in real-time while a viewfinder of a digital camera is active. In various implementations, this method continues by extracting scene characteristics from at least one most recently buffered image frame, the scene characteristics comprising any combination of exposure, face detection, motion of subjects, and motion of the camera. Further, in various implementations, this process then determines and applies one or more real-time automatic adjustments of image capture settings of the camera as a real-time function of the extracted scene characteristics. In various implementations, these image capture settings comprise a determination of a variable first number of most recently buffered image frames to be extracted from the buffer following a detection of a shutter activation of the camera and a determination of a variable second number of image frames to be captured by the camera following the detection of the shutter activation. Finally, in various implementations, in response to detection of the camera shutter activation, this method constructs an image moment comprising the first number of most recently buffered image frames extracted from the buffer and the second number of image frames captured by the camera following the shutter activation.

As an eighteenth example, in various implementations, the first example is further modified via means, processes or techniques wherein the image capture settings further comprise any combination of camera exposure time, ISO setting, camera white balance setting, and camera aperture setting.

As a nineteenth example, in various implementations, any of the seventeenth example and the eighteenth example are further modified via means, processes or techniques further comprising automatically ranking each of the image frames in the image moment in terms of a predicted subjective goodness level, automatically enhancing the one or more of the highest ranked image frames, and outputting one or more of the enhanced image frames.

As a twentieth example, in various implementations, any of the seventeenth example, the eighteenth example and the nineteenth example are further modified via means, processes or techniques further comprising automatically evaluating the frames of the image moment to determine if two or more of those frames contain content that is sufficiently similar while exhibiting enough relative motion that those images would be suitable for construction of a looping animation, and constructing a looping animation from the suitable frames of the image moment.

5.0 Exemplary Operating Environments

Figure 5:
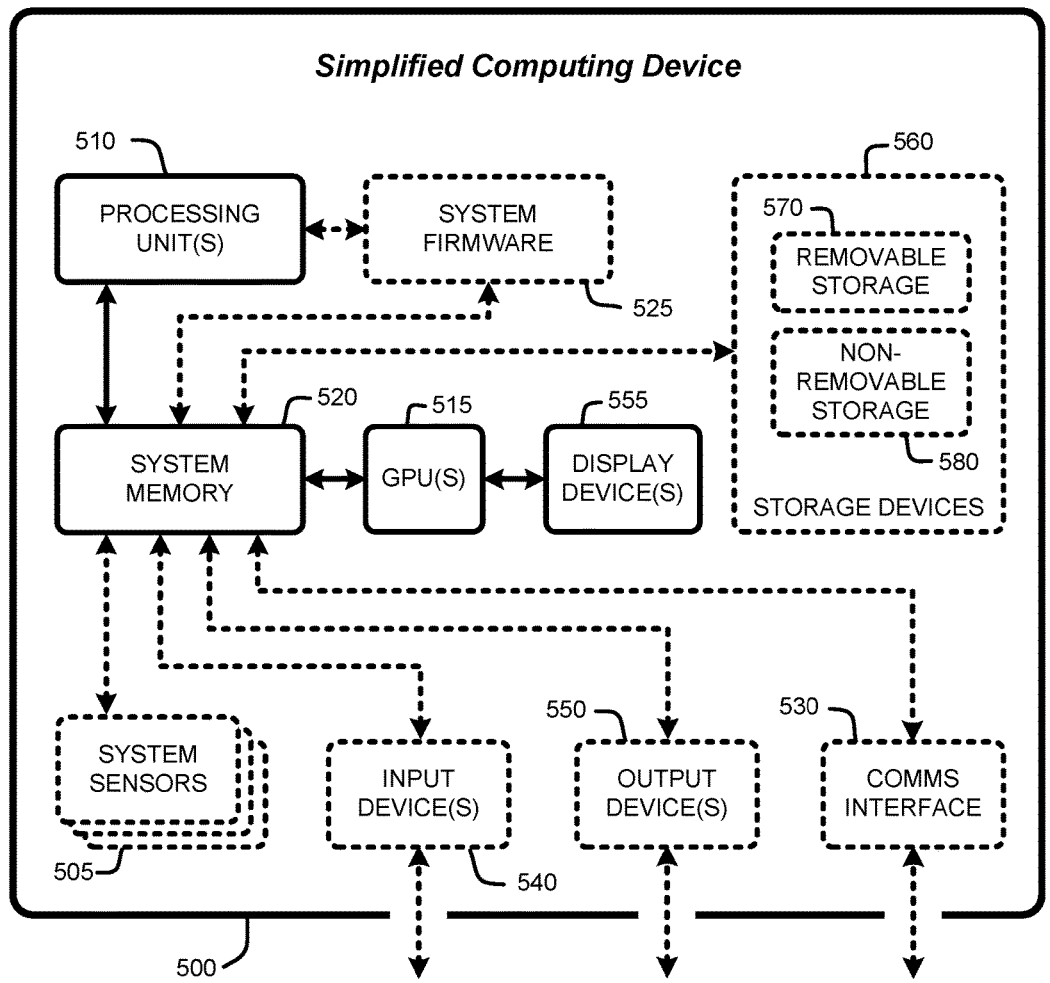
FIG. 5 is a general system diagram depicting a simplified general-purpose computing device having simplified computing and I/O capabilities for use in effecting various implementations of the Moment Capture System, as described herein.

The Moment Capture System implementations described herein are operational within numerous types of general purpose or special purpose computing system environments or configurations. FIG. 5 illustrates a simplified example of a general-purpose computer system on which various implementations and elements of the Moment Capture System, as described herein, may be implemented. Any boxes that are represented by broken or dashed lines in the simplified computing device 500 shown in FIG. 5 represent alternate implementations of the simplified computing device. As described below, any or all of these alternate implementations may be used in combination with other alternate implementations that are described throughout this document.

The simplified computing device 500 is typically found in devices having at least some minimum computational capability such as personal computers (PCs), server computers, handheld computing devices, laptop or mobile computers, communications devices such as cell phones and personal digital assistants (PDAs), multiprocessor systems, microprocessor-based systems, set top boxes, programmable consumer electronics, network PCs, minicomputers, mainframe computers, and audio or video media players.

To allow a device to realize the Moment Capture System implementations described herein, the device should have a sufficient computational capability and system memory to enable basic computational operations. In particular, the computational capability of the simplified computing device 500 shown in FIG. 5 is generally illustrated by one or more processing unit(s) 510, and may also include one or more graphics processing units (GPUs) 515, either or both in communication with system memory 520. The processing unit(s) 510 of the simplified computing device 500 may be specialized microprocessors (such as a digital signal processor (DSP), a very long instruction word (VLIW) processor, a field-programmable gate array (FPGA), or other micro-controller) or can be conventional central processing units (CPUs) having one or more processing cores and that may also include one or more GPU-based cores or other specific-purpose cores in a multi-core processor.

In addition, the simplified computing device 500 may also include other components, such as, for example, a communications interface 530. The simplified computing device 500 may also include one or more conventional computer input devices 540 (e.g., touchscreens, touch-sensitive surfaces, pointing devices, keyboards, audio input devices, voice or speech-based input and control devices, video input devices, haptic input devices, devices for receiving wired or wireless data transmissions, and the like) or any combination of such devices.

Similarly, various interactions with the simplified computing device 500 and with any other component or feature of the Moment Capture System, including input, output, control, feedback, and response to one or more users or other devices or systems associated with the Moment Capture System, are enabled by a variety of Natural User Interface (NUI) scenarios. The NUI techniques and scenarios enabled by the Moment Capture System include, but are not limited to, interface technologies that allow one or more users user to interact with the Moment Capture System in a "natural" manner, free from artificial constraints imposed by input devices such as mice, keyboards, remote controls, and the like.

Such NUI implementations are enabled by the use of various techniques including, but not limited to, using NUI information derived from user speech or vocalizations captured via microphones or other input devices 540 or system sensors 505. Such NUI implementations are also enabled by the use of various techniques including, but not limited to, information derived from system sensors 505 or other input devices 540 from a user's facial expressions and from the positions, motions, or orientations of a user's hands, fingers, wrists, arms, legs, body, head, eyes, and the like, where such information may be captured using various types of 2D or depth imaging devices such as stereoscopic or time-of-flight camera systems, infrared camera systems, RGB (red, green and blue) camera systems, and the like, or any combination of such devices.

Further examples of such NUI implementations include, but are not limited to, NUI information derived from touch and stylus recognition, gesture recognition (both onscreen and adjacent to the screen or display surface), air or contact-based gestures, user touch (on various surfaces, objects or other users), hover-based inputs or actions, and the like. Such NUI implementations may also include, but are not limited to, the use of various predictive machine intelligence processes that evaluate current or past user behaviors, inputs, actions, etc., either alone or in combination with other NUI information, to predict information such as user intentions, desires, and/or goals. Regardless of the type or source of the NUI-based information, such information may then be used to initiate, terminate, or otherwise control or interact with one or more inputs, outputs, actions, or functional features of the Moment Capture System.

However, the aforementioned exemplary NUI scenarios may be further augmented by combining the use of artificial constraints or additional signals with any combination of NUI inputs. Such artificial constraints or additional signals may be imposed or generated by input devices 540 such as mice, keyboards, and remote controls, or by a variety of remote or user worn devices such as accelerometers, electromyography (EMG) sensors for receiving myoelectric signals representative of electrical signals generated by user's muscles, heart-rate monitors, galvanic skin conduction sensors for measuring user perspiration, wearable or remote biosensors for measuring or otherwise sensing user brain activity or electric fields, wearable or remote biosensors for measuring user body temperature changes or differentials, and the like. Any such information derived from these types of artificial constraints or additional signals may be combined with any one or more NUI inputs to initiate, terminate, or otherwise control or interact with one or more inputs, outputs, actions, or functional features of the Moment Capture System.

The simplified computing device 500 may also include other optional components such as one or more conventional computer output devices 550 (e.g., display device(s) 555, audio output devices, video output devices, devices for transmitting wired or wireless data transmissions, and the like). Typical communications interfaces 530, input devices 540, output devices 550, and storage devices 560 for general-purpose computers are well known to those skilled in the art, and will not be described in detail herein.

The simplified computing device 500 shown in FIG. 5 may also include a variety of computer-readable media. Computer-readable media can be any available media that can be accessed by the computing device 500 via storage devices 560, and include both volatile and nonvolatile media that is either removable 570 and/or non-removable 580, for storage of information such as computer-readable or computer-executable instructions, data structures, program modules, or other data.

Computer-readable media includes computer storage media and communication media. Computer storage media refers to tangible computer-readable or machine-readable media or storage devices such as digital versatile disks (DVDs), Blu-ray discs (BD), compact discs (CDs), floppy disks, tape drives, hard drives, optical drives, solid state memory devices, random access memory (RAM), read-only memory (ROM), electrically erasable programmable read-only memory (EEPROM), CD-ROM or other optical disk storage, smart cards, flash memory (e.g., card, stick, and key drive), magnetic cassettes, magnetic tapes, magnetic disk storage, magnetic strips, or other magnetic storage devices. Further, a propagated signal is not included within the scope of computer-readable storage media.

Retention of information such as computer-readable or computer-executable instructions, data structures, program modules, and the like, can also be accomplished by using any of a variety of the aforementioned communication media (as opposed to computer storage media) to encode one or more modulated data signals or carrier waves, or other transport mechanisms or communications protocols, and can include any wired or wireless information delivery mechanism. The terms "modulated data signal" or "carrier wave" generally refer to a signal that has one or more of its characteristics set or changed in such a manner as to encode information in the signal. For example, communication media can include wired media such as a wired network or direct-wired connection carrying one or more modulated data signals, and wireless media such as acoustic, radio frequency (RF), infrared, laser, and other wireless media for transmitting and/or receiving one or more modulated data signals or carrier waves.

Furthermore, software, programs, and/or computer program products embodying some or all of the various Moment Capture System implementations described herein, or portions thereof, may be stored, received, transmitted, or read from any desired combination of computer-readable or machine-readable media or storage devices and communication media in the form of computer-executable instructions or other data structures. Additionally, the claimed subject matter may be implemented as a method, apparatus, or article of manufacture using standard programming and/or engineering techniques to produce software, firmware 525, hardware, or any combination thereof to control a computer to implement the disclosed subject matter. The term "article of manufacture" as used herein is intended to encompass a computer program accessible from any computer-readable device, or media.

The Moment Capture System implementations described herein may be further described in the general context of computer-executable instructions, such as program modules, being executed by a computing device. Generally, program modules include routines, programs, objects, components, data structures, and the like, that perform particular tasks or implement particular abstract data types. The Moment Capture System implementations may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Additionally, the aforementioned instructions may be implemented, in part or in whole, as hardware logic circuits, which may or may not include a processor.

Alternatively, or in addition, the functionality described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), and so on.

6.0 Other Implementations

The foregoing description of the Moment Capture System has been presented for the purposes of illustration and description. It is not intended to be exhaustive or to limit the claimed subject matter to the precise form disclosed. Many modifications and variations are possible in light of the above teaching. Further, any or all of the aforementioned alternate implementations may be used in any combination desired to form additional hybrid implementations of the Moment Capture System. It is intended that the scope of the Moment Capture System be limited not by this detailed description, but rather by the claims appended hereto. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and other equivalent features and acts are intended to be within the scope of the claims.

What has been described above includes example implementations. It is, of course, not possible to describe every conceivable combination of components or methodologies for purposes of describing the claimed subject matter, but one of ordinary skill in the art may recognize that many further combinations and permutations are possible. Accordingly, the claimed subject matter is intended to embrace all such alterations, modifications, and variations that fall within the spirit and scope of detailed description of the Moment Capture System described above.

In regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the foregoing implementations include a system as well as a computer-readable storage media having computer-executable instructions for performing the acts and/or events of the various methods of the claimed subject matter.

There are multiple ways of realizing the foregoing implementations (such as an appropriate application programming interface (API), tool kit, driver code, operating system, control, standalone or downloadable software object, or the like), which enable applications and services to use the implementations described herein. The claimed subject matter contemplates this use from the standpoint of an API (or other software object), as well as from the standpoint of a software or hardware object that operates according to the implementations set forth herein. Thus, various implementations described herein may have aspects that are wholly in hardware, or partly in hardware and partly in software, or wholly in software.

The aforementioned systems have been described with respect to interaction between several components. It will be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (e.g., hierarchical components).

Additionally, one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known to enable such interactions.

What is claimed is:

1. A system, comprising:
    a digital camera configured to continuously capture image frames to a buffer while a viewfinder of the camera is active;
    applying computing functionality of the digital camera to extract a plurality of scene characteristics from one or more most recently buffered image frames as an ongoing real-time function;
    applying computing functionality of the digital camera to determine and apply real-time automatic adjustments of image capture settings of the camera as an ongoing real-time function of most recently extracted scene characteristics;
    the image capture settings comprising at least a determination of a first number of most recently buffered image frames to be extracted from the buffer following a detection of a shutter activation of the camera and a determination of a second number of image frames to be captured by the camera following the detection of the shutter activation;
    in response to detection of the camera shutter activation, applying the computing functionality of the camera to construct and output an image moment comprising multiple image frames; and
    the multiple image frames of the image moment comprising the first number of most recently buffered image frames extracted from the buffer and the second number of image frames captured by the camera following the shutter activation.

2. The system of claim 1, the image capture settings further comprising an image frame capture rate.

3. The system of claim 1, the image capture settings further comprising an image frame exposure setting.

4. The system of claim 1, the image capture settings further comprising any combination of camera ISO setting, camera white balance setting, and camera aperture setting.

5. The system of claim 1, the scene characteristics further comprising any combination of exposure, face detection, motion of subjects, and motion of the camera.

6. The system of claim 1, further comprising applying an image selection model to automatically rank each of the image frames in the image moment in terms of a predicted subjective goodness level.

7. The system of claim 6, further comprising automatically outputting a highest ranked one of the image frames.

8. The system of claim 1, further comprising automatically enhancing one or more frames of the image moment via one or more image enhancement techniques to improve a subjective appearance of those one or more frames.

9. The system of claim 1 further comprising:
    automatically evaluating the frames of the image moment to determine if two or more of those frames contain content that is sufficiently similar while exhibiting enough relative motion that those images would be suitable for construction of a looping animation; and
    constructing a looping animation from the suitable frames of the image moment.

10. A computer-implemented process comprising applying a general-purpose computing device to perform process actions for:
    causing a digital camera to continuously capture image frames to a buffer;
    performing a real-time extraction of scene characteristics from a most recently buffered image frame;

determining and applying one or more real-time automatic adjustments of image capture settings of the camera as a function of the extracted scene characteristics;

the image capture settings comprising any combination of camera ISO setting, exposure time, camera white balance setting, and camera aperture setting;

the image capture settings further comprising a determination of a first number of most recently buffered image frames to be extracted from the buffer following a detection of a shutter activation of the camera and a determination of a second number of image frames to be captured by the camera following the detection of the shutter activation; and in response to detection of the camera shutter activation, constructing an image moment comprising the first number of most recently buffered image frames extracted from the buffer and the second number of image frames captured by the camera following the shutter activation.

11. The computer-implemented process of claim 10, the image capture settings further comprising an image frame capture rate.

12. The computer-implemented process of claim 10, the scene characteristics further comprising any combination of exposure, face detection, motion of subjects, and motion of the camera.

13. The computer-implemented process of claim 10, further comprising:

applying an image selection model to automatically rank each of the image frames in the image moment in terms of a predicted subjective goodness level; and outputting one or more of the highest ranked image frames.

14. The computer-implemented process of claim 13, further comprising automatically enhancing the one or more of the highest ranked image frames prior to outputting those frames.

15. The computer-implemented process of claim 14, the automatic enhancement further comprising any combination of one or more image enhancement techniques to improve a subjective appearance of the one or more highest ranked image frames.

16. The computer-implemented process of claim 10, further comprising:

automatically evaluating the frames of the image moment to determine if two or more of those frames contain content that is sufficiently similar while exhibiting enough relative motion that those images would be suitable for construction of a looping animation; and constructing a looping animation from the suitable frames of the image moment.

17. A computer storage device having computer executable instructions stored therein, said instructions causing a computing device to execute a real-time method, comprising:

causing a digital camera to capture and buffer image frames in real-time while a viewfinder of a digital camera is active;

extracting scene characteristics from at least one most recently buffered image frame, the scene characteristics comprising any combination of exposure, face detection, motion of subjects, and motion of the camera;

determining and applying one or more real-time automatic adjustments of image capture settings of the camera as a real-time function of the extracted scene characteristics;

the image capture settings comprising a determination of a variable first number of most recently buffered image frames to be extracted from the buffer following a detection of a shutter activation of the camera and a determination of a variable second number of image frames to be captured by the camera following the detection of the shutter activation; and in response to detection of the camera shutter activation, constructing an image moment comprising the first number of most recently buffered image frames extracted from the buffer and the second number of image frames captured by the camera following the shutter activation.

18. The computer executable instructions of claim 17, the image capture settings further comprising any combination of camera exposure time, ISO setting, camera white balance setting, and camera aperture setting.

19. The computer executable instructions of claim 17, further comprising:

automatically ranking each of the image frames in the image moment in terms of a predicted subjective goodness level;

automatically enhancing the one or more of the highest ranked image frames; and outputting one or more of the enhanced image frames.

20. The computer executable instructions of claim 17, further comprising:

automatically evaluating the frames of the image moment to determine if two or more of those frames contain content that is sufficiently similar while exhibiting enough relative motion that those images would be suitable for construction of a looping animation; and constructing a looping animation from the suitable frames of the image moment.

* * * * *